Sept. 20, 1949. W. T. MAGUIRE 2,482,589
IMPLEMENT HOLDER
Filed July 18, 1946
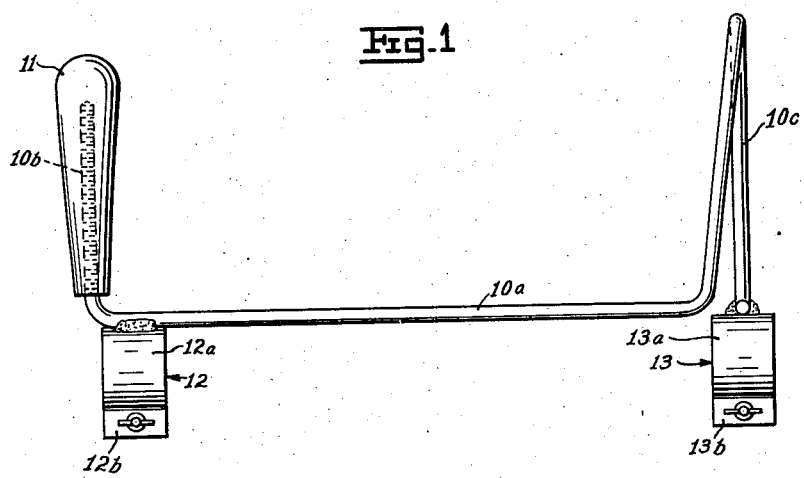
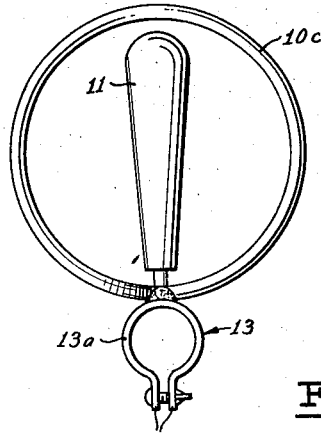
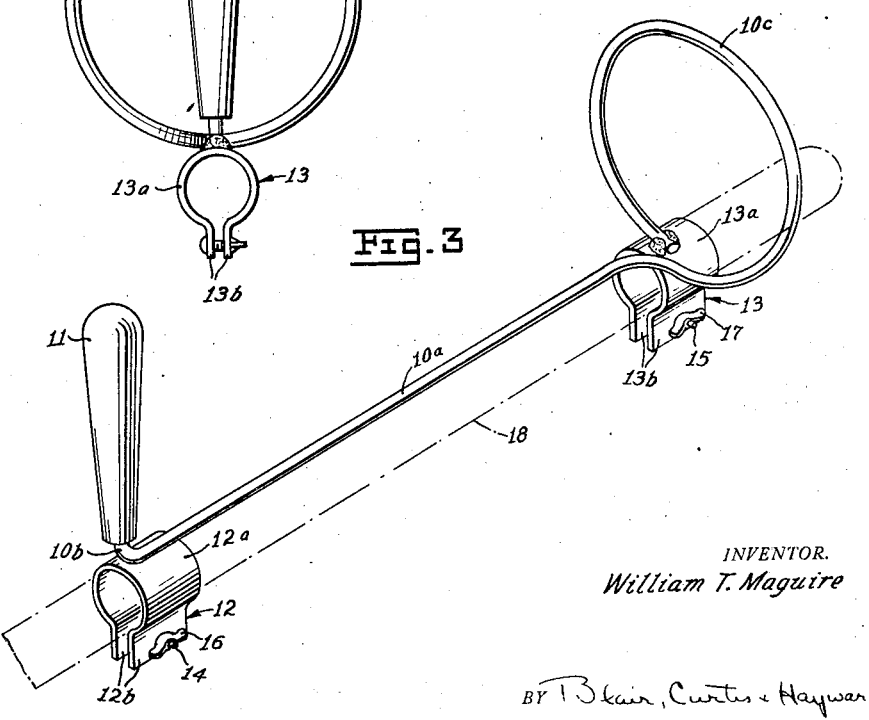
INVENTOR.
William T. Maguire
BY Blair, Curtis & Hayward
ATTORNEYS Patented Sept. 20, 1949

2,482,589

UNITED STATES PATENT OFFICE 2,482,589

IMPLEMENT HOLDER

William T. Maguire, Larchmont, N. Y.

Application July 18, 1946, Serial No. 684,591

3 Claims. (Cl. 294—58)

This invention relates to an implement holder.

One of the objects of this invention is to provide an implement holder which is simple, practical, and thoroughly durable. Another object is to provide a device of the above character which may be economically manufactured with a minimum amount of labor. Another object is to provide a device of the above character which permits the implement used with the holder to be quickly and easily changed. Another object is to provide a device of the above character which will be neat and attractive in appearance. Another object is to provide a device of the above character which permits a user with one arm to operate an implement normally requiring the use of both arms. Another object is to provide a device of the above character which will be light in weight and yet be of such sturdy construction as to withstand hard usage. Other objects will be in part obvious and in part pointed out hereinafter.

The invention accordingly consists in the features of construction, combinations of elements, and arrangements of parts, all as will be exemplified in the structure to be hereinafter described and the scope of the application of which will be indicated in the following claims.

In the accompanying drawings in which is shown one of the various possible embodiments of my invention, Figure 1 is a side elevation of my implement holder;

Figure 2 is an end elevation taken from the right-hand end of the implement holder shown in Figure 1; and, Figure 3 is a perspective view of the implement holder, the handle of an implement being diagrammatically illustrated to show its manner of connection to the implement holder.

Similar reference characters refer to similar parts throughout the several views of the drawings.

As conducive to a clearer understanding of certain features of this invention, it might here be pointed out that in performing many everyday tasks, implements are used which now require the use of both arms. This is caused by the fact that in many implements, such as a broom, the leverage created by the handle of the broom between the place where it is gripped and the sweeping end of the broom makes it extremely difficult if not impossible to manipulate a broom with one hand. Thus the user is forced to use both hands, sacrificing the added efficiency of being able to carry another implement, such as a dust pan, in his other hand. Accordingly, it is another object of this invention to provide an implement holder which permits a person to operate an implement, such as a broom, effectively with one hand and arm and leave the other hand and arm free for such other use as may be desirable.

Referring now to the drawings, the implement shown is constructed for use on the forearm of the user. The body of the implement is preferably made from rigid relatively heavy wire and includes a center portion 10a, a handle portion 10b, and a ring shaped supporting portion 10c. The center portion 10a is straight and its left-hand end, as viewed in Figures 1 and 3, is bent upwardly at right angles to center portion 10a to form a handle portion 10b. A handle 11 is provided with a bore therein of slightly greater diameter than the diameter of the handle portion of the body of the implement which extends upwardly into the bore in handle 11. Handle 11 is secured to portion 10a in any suitable manner, such as by cement.

Supporting portion 10c of the implement is circular in shape and is of a diameter to fit the upper portion of the forearm of the user. Portion 10c lies substantially in a plane which is at right angles to the axis of center portion 10a of the implement. Referring to Figure 2, it will be noted that the handle 11 of the implement holder is diametrically aligned with respect to ring shaped supporting portion 10c and thus when the implement is mounted upon the forearm of the user, handle 11 is so positioned that it may be readily gripped by the user.

To connect an implement to the implement holder, a pair of clamps, generally indicated at 12 and 13, are provided. These clamps include cylindrically shaped portions 12a and 13a which are connected to one end of the center portion of the body and to the free end of the ring shaped portion of the implement holder. Clamps 12 and 13 are connected to the body of the implement holder in any suitable manner, such as by spot welding, and are positioned on the opposite side of center portion 10a from handle 11 and supporting portion 10c. Clamps 12 and 13 are made from resilient sheet metal and are provided with wing portions 12b and 13b. Bolts 14 and 15 which extend through holes in the wing portions of clamps 12 and 13, respectively, are provided with wing nuts 16 and 17 which when tightened draw the wing portions of the clamps together and thus reduce the diameter of the cylindrically shaped portions 12a and 13a of the clamps.

To connect an implement to the implement holder, the handle of an implement, indicated by the dotted line 18, is passed through clamps 12 and 13, and nuts 16 and 17 are then tightened. This securely connects the implement to the implement holder at points spaced a substantial distance from each other giving the user a maximum of control over the implement being used. When it is desired to use the implement holder, the implement which it is desired to use is first connected to the implement holder by clamps 12 and 13. Next the forearm is passed through the ring shaped portion 10c of the body of the holder and handle 11 is grasped with the hand. At this time the implement is securely mounted on the forearm permitting the user to manipulate the implement with a maxium of ease and efficiency. If the ring shaped portion 10c is of incorrect diameter to properly fit the forearm of the user, its diameter will be readily reduced by bending opposite sides of the ring shaped portion toward each other. This is permitted because only the free end of ring shaped portion 10c is connected to clamp 13 and not to center portion 10c.

Because of its construction, it will be noted that this holder permits the user to operate an implement, such as a broom or rake, with only one arm, thus leaving the other arm entirely free. Furthermore, in certain instances, such as in gardening, it may be desirable to operate more than one implement at the same time, such as two hoes. In such a case, two implement holders may be used, one on each arm.

It will thus be seen that a practical and efficient implement holder has been disclosed in which the several objects hereinabove mentioned, as well as many others, are successfully accomplished. By using this implement holder, a maximum of work may be accomplished in a minimum of time with a minimum of effort. Furthermore, the implement holder disclosed is one which may be manufactured at exceedingly low cost and yet be of sturdy and efficient construction.

As many possible embodiments may be made of the mechanical features of the above invention, and as many changes might be made in the embodiment above set forth, it is to be understood that all matter hereinabove set forth, or shown in the accompanying drawings, is to be interpreted as illustrative and not in a limiting sense.

I claim:

1. In a device of the nature described, in combination, a body member, handle means connected to said body member adjacent one end thereof, ring shaped means connected to said body member adjacent the other end thereof, said ring shaped means being adapted to fit around the forearm of the user, and a pair of clamps connected to said body member, said clamps being spaced from each other a substantial distance and being positioned on the opposite side of said body member from said handle means and said ring shaped means, said clamps being operable to detachably connect an implement to said body member.

2. In an implement holder, in combination, a substantially straight body member formed of heavy metal wire, a ring shaped member integrally formed on one end of said metal wire, said ring shaped member lying in a plane positioned at right angles to the axis of said body member, handle means formed on the other end of said body member, said handle means extending outwardly from said body member in the same direction as said ring shaped member and being diametrically aligned with respect to said ring shaped member, a clamp connected to the free end of said ring shaped member, and a clamp connected to said body member adjacent said handle means, said clamps being manually operable to detachably connect an implement to the implement holder.

3. In an implement holder, in combination, a straight body member formed of heavy metal wire, a loop formed of the same wire as said body member, said loop being of circular shape and of sufficient diameter to fit around the forearm of a person, the other end of said body member being bent upwardly at right angles to said body member to form a support, a handle mounted on said support, said handle being diametrically aligned with respect to said loop, a manually operable clamp connected to said body member substantially opposite to said handle, and a manually operable clamp secured to the free end of said loop, said clamps being aligned with respect to each other, whereby the handle of an implement may be connected to said implement holder by said clamps.

WILLIAM T. MAGUIRE.

REFERENCES CITED

The following references are of record in the file of this patent:

UNITED STATES PATENTS

| Number | Name | Date |
|--------|------|------|
| 407,571 | Calef | July 23, 1889 |
| 712,843 | Paul | Nov. 4, 1902 |
| 1,583,596 | Lacklen | May 4, 1926 |
| 1,761,497 | Smith | June 3, 1930 |